INVENTOR
ERNEST P. KOLLAR
BY Earl C. Hancock
ATTORNEY

United States Patent Office 3,517,592

Patented June 30, 1970

3,517,592

RECIPROCATING LENS PHOTOCOMPOSER

Ernest P. Kollar, Broomfield, Colo., assignor to International Business Machines Corporation, Armonk, N.Y., a corporation of New York Filed Nov. 14, 1967, Ser. No. 682,843
Int. Cl. B41b *19/02*
U.S. Cl. 95—4.5 1 Claim

ABSTRACT OF THE DISCLOSURE

Characters to be recorded on a photosensitive material are divided into a series of vertical lines each having one or more illuminated portions. The vertical lines are consecutively displayed at the same general location. Horizontal displacement of the vertical lines relative to the photosensitive material is accomplished by variable light coupling between the photosensitive material and the location at which the vertical lines are displayed.

CROSS-REFERENCE TO RELATED APPLICATION

Application Ser. No. 682,845, entitled "Reciprocating Lens Photocomposer," by James L. Overacker, filed concurrently herewith and assigned to the same assignee as the present application, claims a separate invention which was a direct outgrowth of the basic invention claimed in this application. Although the embodiments originally considered for utilizating the invention claimed in this application differed from the Overacker invention, the Overacker invention is considered to set forth the best mode presently contemplated for implementing the invention claimed herein. Therefore, the preferred embodiment described hereinbelow is substantially the same as that set forth in the Overacker application.

BACKGROUND OF THE INVENTION

Field of the invention

The invention relates to apparatus for composing a sequence of characters onto a photosensitive material. More particularly, the present invention relates to devices for the photocomposition of alphanumeric characters onto a recording medium such as a film strip by sequential illumination of the characters, preferably by electronic means, with the light defining these characters being coupled for positioning on the recording medium. The present invention is particularly useful for photocomposition of graphic arts quality characters on a medium which can be utilized for the fabrication of printing plates.

Description of the prior art

The use of the computer for controlling graphic arts quality photocomposition of text material for the printing and publishing industry has received ever-increasing attention. The development of hyphenation and justification programs makes it possible to compose raw text material into a form appropriate for printing at speeds that tax the imagination. Under computer control, various systems have been developed for displaying characters for exposure to a photosensitive material which is usually photographic film. Processes have been developed for converting these exposed films into printing plates for the production of documents.

Frequently, such systems relied upon a rotating disc which had a series of character-shaped slots and a computer controlled flash lamp. Such systems generally require the disc to complete one rotation for each character position, thus, requiring the film or the light coupler between the disc and film to be moved in increments.

This restricts the operating speed considerably. Furthermore, the physical limitation of disc size generally means that only one type font can be used at a time. To change type fonts, either the disc must be replaced or another disc must be switched into operation which involves considerable complication of controls both for the switching and for the light paths.

Various substitutes have been tried for the character disc with varying degrees of success. For instance, a matrix of flash lamps each arranged to illuminate one character through a matrix mask has been suggested. This avoids the requirement of the rotating disc, but the optical paths involved require complicated controls in order to properly focus and position the characters to be recorded with relatively constant intensity. Still other systems have used a special cathode ray tube which effectively contains a character matrix so that these characters can be displayed on the tube face by selective controls of the signals introduced to the tube. Such systems also suffer from the disadvantage of having a fixed type font so that the tube must be replaced to change the type font.

Some of the relatively recent approaches have suggested segmenting the string of characters making up a line into a series of blanked and unblanked portions. Thus, a sweep generator much like a television presentation can be used to rapidly draw a sequence of lines on a cathode ray tube face with minute spacing therebetween. After all the unblanked portions have been juxtaposed on the face of a CRT, the appropriate characters have been recorded on film. One such system has used segmented horizontal lines for generating such a presentation. This system requires a lower frequency sweep control but requires that each line must be separately encoded. Another system uses segmentation of vertical raster lines which, although requiring higher frequency scanning, permits the storing of codes for printing a given character as subroutines which reduces the demands on programming. Both such systems generate an entire line of characters at a time on the CRT face which means that the computer must supply an intricate set of commands to the photocomposer device which also must include the apparatus necessary for handling and carrying out these controls.

SUMMARY OF THE INVENTION

The present invention is a photocomposer for accepting computer generated commands which define each character to be recorded through a sequence of vertical lines having one or more illuminated portions. These lines are displayed in one general area and a moving optical system positions the characters so defined in the horizontal direction relative to the recording photosensitive material.

In one embodiment of this invention which is discussed in detail hereinafter, the vertical lines are displayed in a plane generally parallel to the plane of the photosensitive material. In this embodiment, a continuously moving lens system is located between the area in which the characters are displayed and the photosensitive material with the lens movement effecting horizontal positioning. Thus, a photocomposer in accordance with the present invention only requires simple code commands from the computer but is still capable of handling changes of type fonts even in the middle of a line of characters.

An object of this invention is to provide photocomposing of characters on a recording medium.

Another object of this invention is to provide the recording of characters on a photosensitive medium under command of a computer.

Yet another object is to photographically record characters displayed as a sequence of vertical lines having one or more illuminated portions by use of a movable optical coupling.

The foregoing and other objects, features and advantages of the present invention will be apparent from the following more particular description of the preferred embodiment of the invention as is illustrated in the accompanying drawings.

DESCRIPTION OF THE PREFERRED EMBODIMENT

Figure 1:
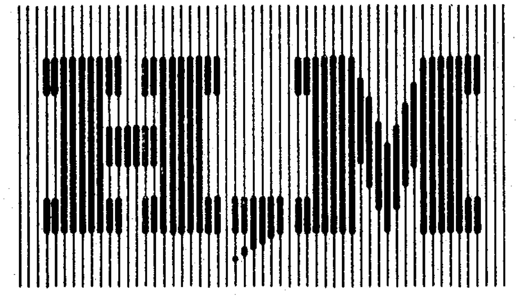
FIG. 1 illustrates how characters can be defined by a sequence of vertical lines.

FIG. 1 generally illustrates how characters and symbols can be presented by dividing them into a series of vertical lines. Each vertical line within a character has one or more darker portions which, when a sequence of such lines are put together as shown, defines the outline of the character. If the characters shown were being presented on a cathode ray tube (CRT), they would be drawn by deflecting the beam from the bottom of the leftmost line to the top thereof, returning the beam to the bottom of the second line which is then drawn from bottom to top and so forth. For a CRT, the lighter portions of the vertical lines usually would not be displayed at all, and the beam would be unblanked so as to display light on the CRT face only when the darker portions are encountered. Thus, the fourth vertical line would contain two portions or segments during which the CRT beam is unblanked.

The characters shown in FIG. 1 contain only a small number of vertical lines, but the outline of the characters is still clearly discernable. If graphic arts quality of character definition is desired, a considerably larger number of vertical lines which are minutely spaced would be used. For instance, several hundred such lines for every character would provide a display in which the presence of segmentation could not be detected relative to a photographic recording medium.

As mentioned hereinbefore, one prior art system displayed an entire line of characters across the CRT face by drawing a series of vertical lines much as shown in FIG. 1. The difficulty with this system is that relatively exotic control circuitry must be included for the CRT in order to effect the minute spacing, and the computer must provide special commands for this control circuitry. The present invention overcomes these difficulties by displaying each vertical line in the same general area and using a light coupling means for effecting the spacing between lines.

Figure 2:
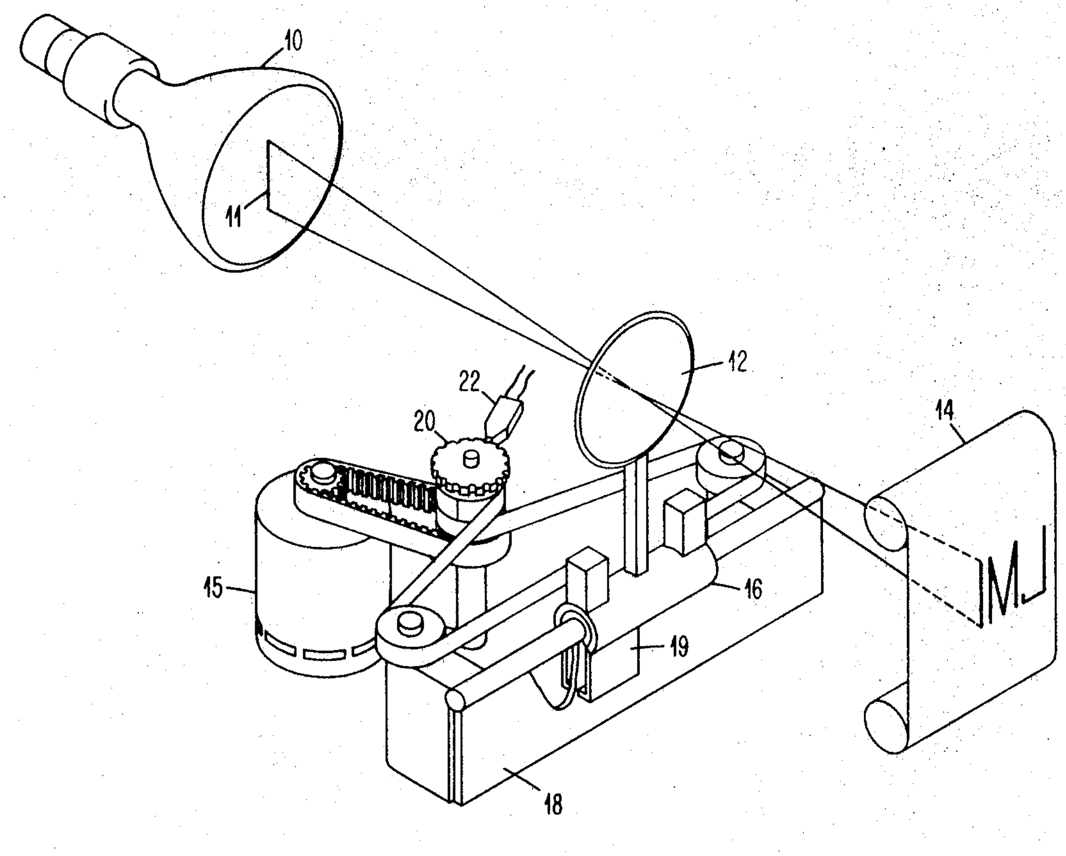
FIG. 2 shows a typical arrangement for implementing the present invention.

The foregoing can be more fully appreciated from FIG. 2 which presents one example of how light from the display can be distributed across a recording medium. In the configuration shown for FIG. 2, the face of CRT 10 displays each vertical line at one location 11. The light from these lines is passed through lens system 12 for recording on film strip 14. Motor 15 drives a double belt system which in turn causes the slidably mounted base 16 to move lens 12 in a plane substantially parallel to both the plane of the face of CRT 10 and the plane of film 14. Thus, the sequence of vertical lines similar to FIG. 1 which are displayed at location 11 are horizontally positioned relative to film 14 by the movement of lens 12. This results in the composition of characters on film 14 just as the letters "LMI" are shown on film 14.

As the lens reaches a position wherein the line of characters is completed across 14, motor 15 is automatically reversed, and the film is automatically stepped to be ready to receive the next line of characters. Of course, the next line of characters can be written on the return movement of lens 12 in the same manner that they were written in the first direction, except that the vertical lines appear at 11 as if they were being displayed from right to left in FIG. 1 instead of from left to right.

A portion of mounting plate 18 which supports the shaft on which base 16 slides is shown cut away to illustrate how dogs such as 19 hold lens 12 in the desired plane. A tachometer type disc 20 causes pulses to be picked up by detector 22 which indicates the rotary movement of the shaft on which it is mounted and, thus, indicates the point at which characters are being displayed onto film 14. This will be more fully understood in the subsequent description hereof. Actually two discs and detectors like 20 and 22 are used in the system as will be understood hereinafter, but only one is shown in order to simplify the drawing.

It should be understood that stray light from CRT 10 could be inadvertently recorded on film 14 around the edges of lens 12. Therefore, it would generally be desirable to include a light baffle around lens 12 to block such light even though no such system is here shown. For instance, a pair of flexible wings could be attached around lens 12 with the other ends thereof fixed or a slidable plate could encase lens 12. It has been found that the graphic arts quality of the characters recorded can be enhanced by using a lens system 12 which provides a reduction of 4:1 from the area 11 to film 14. Additionally, a multi-element lens can be used for lens system 12 to further improve the quality of the characters recorded. Such multi-element lens are commercially available and will not be discussed further herein, except to say that they can be used to correct for distortion, astigmatism, vignetting, or similar problems for which correction might be desired. However, for many applications, a simple enlarging lens used in a reduction mode for 12 has been found to be satisfactory.

Figure 3:
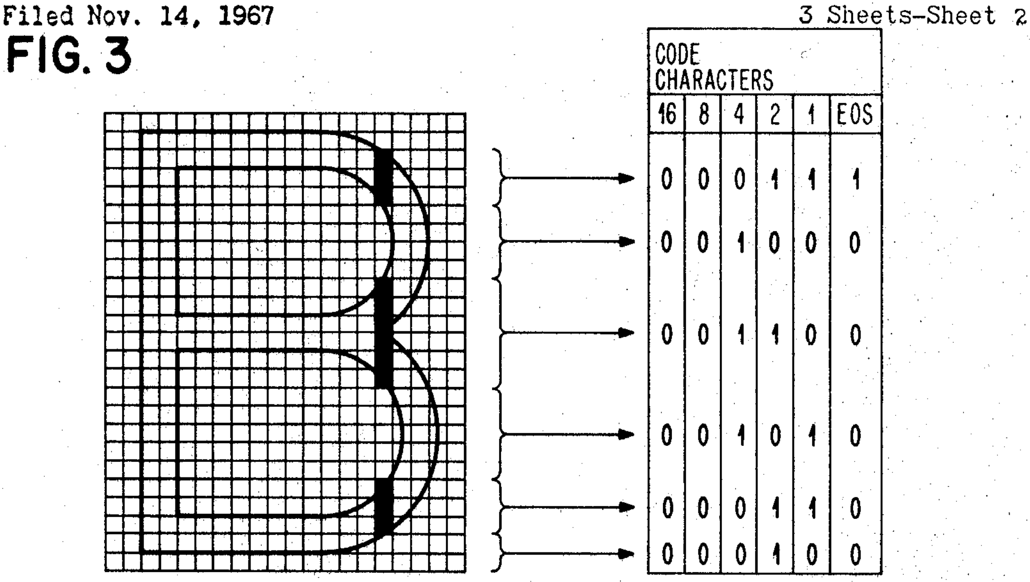
FIGURE 3 correlates the code characters provided by a computer to control the illuminated portions of a single vertical scan.

A simplified form of the coded characters received from a computer for one vertical scan of a character is shown in FIG. 3. A stream of these characters is provided by a computer output and controls the circuitry discussed in detail hereinafter. However, it is to be appreciated that a variety of coding schemes and appropriate control circuitry can be implemented without departing from the spirit of this invention, and the particular arrangements shown are for providing an example only.

The vertical scans of FIG. 3 are assumed to progress from bottom to top. It can be seen that the lowermost code character contains a binary count of 2 which indicates to a CRT control that two blocks of blanked vertical scan are to be traversed by the beam before an unblanked operation is reached. The second character from the bottom contains a binary count of 3 which indicates that the CRT beam is to be unblanked for the next three blocks of the same vertical scan. The next four code characters indicate the remainder of this vertical scan is to comprise five blanked blocks, six unblanked blocks, four blanked blocks and, finally, three unblanked blocks in that order. The last code character contains a bit in the end of scan (EOS) position which indicates that the vertical scan is to return to the bottom of the vertical line position preparatory to writing the next sequence of vertical character segments. In the coding scheme shown herein, the EOS bit is always set in the code character representing the last unblanked portion of a scan.

Figure 4:
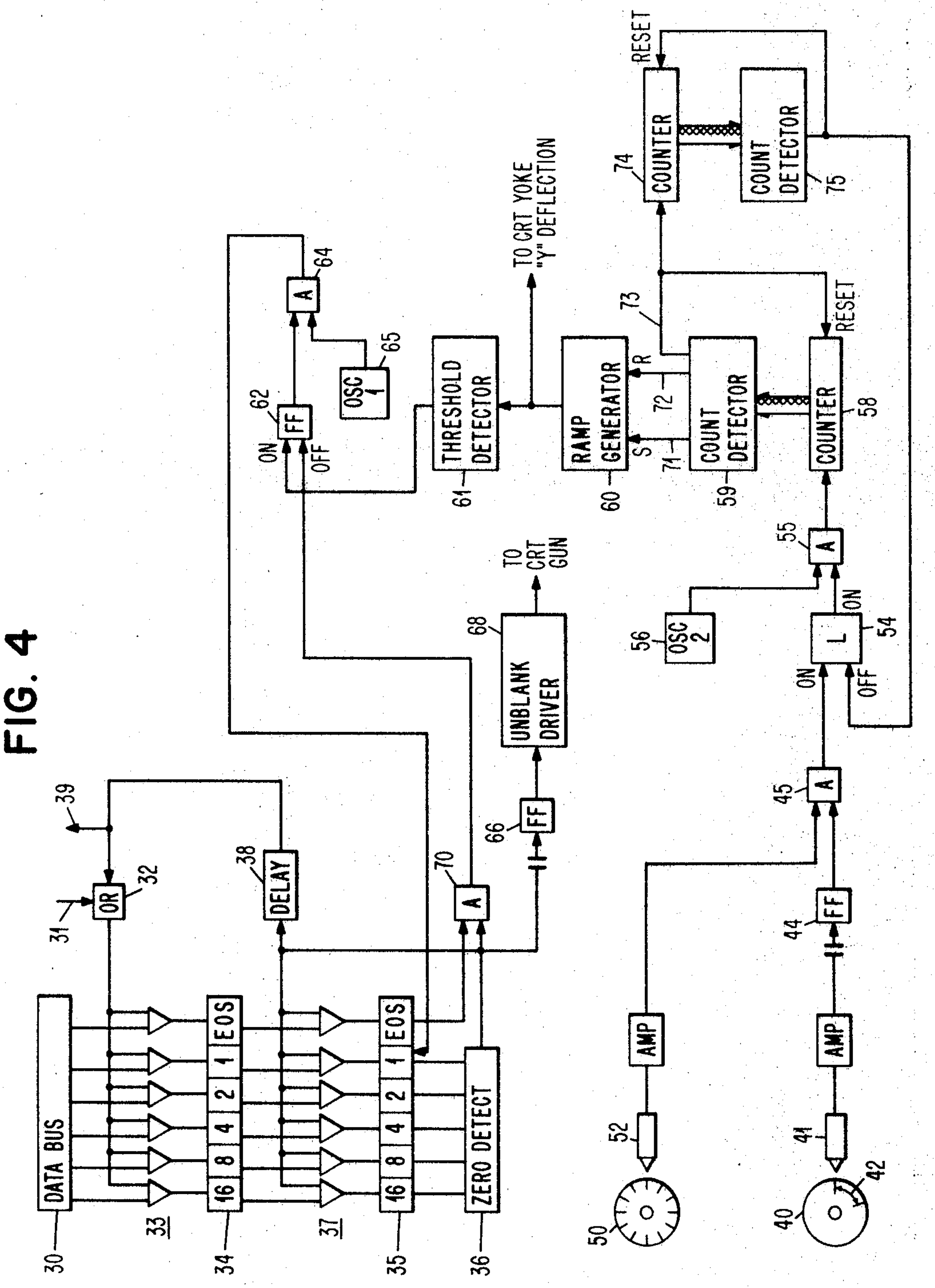
FIG. 4 is a schematic diagram of circuitry for utilizing the character codes of FIG. 3 for generating vertical scans for the CRT of FIG. 2.

The circuitry shown in the schematic diagram of FIG. 4 utilizes coded character sequences similar to those contained in FIG. 3 to generate vertical scans for the CRT display of FIG. 2. Initially, all counters, flip-flop circuits (FF), latches and the like are set to zero or in the reset condition as the case may be. In the FIG. 4 system, the configurations for accepting and decoding commands from the computer, for interfacing with the computer, and for starting and stopping the drive motor 15 (FIG. 2) are not shown since all of these components are well known in the art, and the details thereof are of little value for an overall understanding of the present invention. The computer will send a command which, after decoding, starts the drive motor. After each movement of the lens across an entire line, the motor controls will automatically reverse the motor direction and start the lens moving in the opposite direction and effect incremental movement of the film. If desired, the motor can be continuously running and reversing as long as primary power is on the machine and separate controls for incrementing the film under control of a computer generated command can be used. However, the latter arrangement would require some means for indicating the lens position to the computer if bidirectional photographing is to be used.

It is assumed that the motor starting command has been given, and the first code character is present on data bus 30 from the computer. The computer then energizes line 31 which causes OR 32 to activate the gates shown generally at 33 so that the first character is transferred into register 34. Since decrementing counter 35 will contain all zeros, zero detector 36 will have conditioned the gates shown generally at 37. Thus, the first character will be immediately transferred from register 34 into decrementing counter 35. Because counter 35 then does not contain all zeros, the output of detector 36 will drop deconditioning gates 37. After passing through delay 38, the drop of detector 36 output can be sensed by the computer at terminal 39 so that the next code character is placed on data bus 30 by the computer, and a second load register command introduced to line 31. This condition gates 33 and causes the second code character to be written into register 34 over the first code character.

Disc 40, while the motor is starting, would be positioned so that detector 41 would be in the narrow gap 42 between marks. The purpose of disc 40 is to prevent any characters from being recorded on the film until an appropriate margin has been allowed. After the motor has been brought to operating speed and the first mark has been sensed by detector 41, a short pulse will be introduced to flip-flop 44 to partially condition AND 45.

Disc 50 and detector 52, which are closely analogous in structure to disc 20 and detector 22 of FIG. 2, are arranged to produce an output pulse for a horizontal travel distance equal, by way of example, to the horizontal spacing of sixteen vertical scans. As soon as the first mark on 50 is sensed by detector 52 after FF44 is set, latch 54 is set on, thereby conditioning AND 55. The output of oscillator 56 (OSC #2) is then effective for controlling the subsequent circuitry. The main purpose of oscillator 56 is to control the ramp generator starting and resetting.

The first pulse from oscillator 56 through AND 55 is counted by counter 58. Count detector 59 is a series of appropriately connected AND circuits for providing an output when and only when specific counts are contained in counter 58. When the first count is present in counter 58, detector 59 will provide a START sigal (S) on line 71 to ramp generator 60 which will then begin producing a ramp signal for the "Y" deflection of the CRT yoke. The ramp will not immediately generate a constant beam deflection velocity. Therefore, threshold detector 61 will not produce an output until the voltage of the ramp has reached a level wherein approximate constant beam deflection is reached. The output of detector 61 is shown more clearly in the time base diagram of FIG. 5. Thus an output from detector 61 signals that the linear portion of the ramp has been reached and causes flip-flop 62 to be set.

Figure 6:
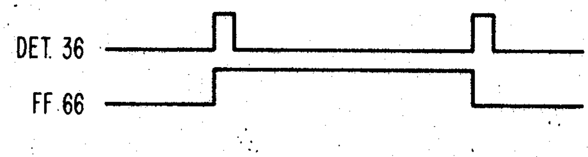
FIG. 6 is a time base diagram related to beam blanking and unblanking.

AND 64 will then be conditioned so as to pass the pulses from oscillator 65 (OSC #1). Each pulse from oscillator 65 can be considered to represent one block of the vertical scan as shown in FIG. 3. These pulses begin decrementing counter 35. As mentioned relative to FIG. 3, the first code character of each scan is a blanked portion or segment, and accordingly, FF66 will remain reset throughout the decrementing of the first code character. As a result, no output is produced by unblank driver circuit 68, and the beam produced by the CRT gun will remain blanked. When the first character contained in counter 35 is decremented to all zeros, zero detector 36 will produce a pulse which will (1) cause FF66 to change state and begin unblanking of the CRT beam, (2) transfer the second code character from register 34 to counter 35 via gates 37, (3) after passing through delay 38, transfer the third character from data bus 30 into register 34 via gates 33, and (4) signal to the computer via line 39 that the fourth code character can be placed on bus 30. The beam unblanking will continue until the second code character is decremented to zero in counter 35 at the end of which detector 36 will cause FF66 to again change state so that the beam will be unblanked for the next code character. The relation of zero detector 36 output pulses and the state of FF66 is shown in FIG. 6.

Eventually, the last code character of the vertical scan will be loaded into counter 35 and decremented to zero as for the other code characters. However, the last character or byte has a bit set in the EOS position in contrast to the other bytes. Therefore, the presence of this EOS bit and the output of detector 36 will produce an output through AND 70 turning FF62 off, thus blocking further decrementing pulses from oscillator 65. If another vertical scan is to be immediately initiated, the computer would already have loaded the first byte thereof into register 34 which would then be transferred into counter 36. However, the last byte of a vertical scan always represents an unblanked segment so that the output of detector 36 will have cleared FF66.

Whether or not the last code character was coextensive with the end of the ramp, counter 58 would continue to count pulses from oscillator 56 until it contained a count equivalent to the length of the ramp. This condition is sensed by detector 59 which then produces a signal on line 72 to effect resetting of ramp generator 60. After a count proportional to the ramp reset time, a signal on line 73 resets counter 58 to zero preparatory for the next vertical scan and adds one count to counter 74. As mentioned hereinbefore, detector 52 will produce one pulse for a horizontal space intended for sixteen vertical scans. Accordingly, count detector 75 will determine when counter 74 has received sixteen pulses and, thereby, reset both counter 74 and latch 54. It has been found that the circuitry may tend to drift so that the sixteen vertical scans will actually be completed before the horizontal spacing for these scans has passed. To compensate, the clearing of latch 54 by the output of detector 75 prevents the initiation of any further vertical scans until the next pulse is received from detector 52 so as to set latch 54.

Detection of the second mark on disc 40 by detector 41 represents the end margin for the line of characters since disc 40 does not quite complete a full revolution for each line of characters. Thus, this second pulse from detector 41 will change the state of FF44 and decondition AND 45 also preventing initiation of any further vertical scans. This second pulse from detector 41 can also be used to automatically stop and reverse the drive motor and to increment the film preparatory for recording the next line of characters.

Figure 5:
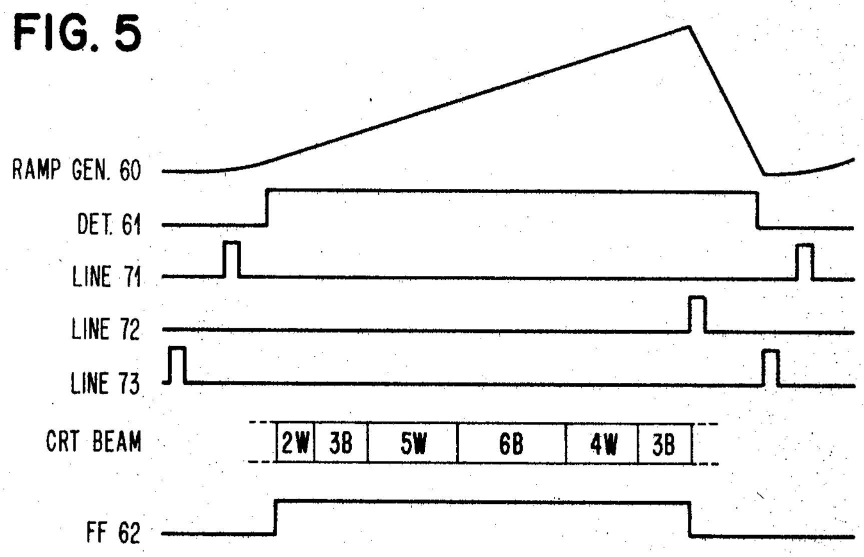
FIG. 5 is a time base diagram relative to the ramp generator, beam unblanking, and associated circuitry of FIG. 4.

In FIG. 5 which is a time base diagram of the operation of the circuitry associated with the ramp generator and the CRT beam control, the counts associated with the code bytes illustrated in FIG. 3 are shown on the line labeled "CRT BEAM." On this line, the symbols 2W, 5W and 4W indicate the blanked (i.e.: "white") counts for tthe CRT beam while the 3B, 6B and 3B symbols indicate unblanked (i.e.: "black") counts for the beam. This diagram is generally self-explanatory in view of the foregoing descriptions and will not be further discussed here.

The present invention is relatively independent of the size of the CRT, and, in fact, permits the usage of economical CRT's. The invention enjoys a less sensitive optical alignment requirement than prior systems, and a relatively inexpensive lens system can be used in the embodiment shown since the field of coverage is small and demagnification is used with the lens.

Many modifications of the present invention will be readily apparent to those having normal skill in the art without departing from the spirit of this invention. For instance, means can be included to periodically reposition the area on the CRT where the vertical scans are being displayed in order to lengthen the life of tube phosphor. Other display devices can be used to produce the vertical scans such as by a row of flash lamps or the like. In addition, a character at a time of vertical scans can be displayed in one CRT area if the timing for these scans and the lens movement are appropriately synchronized.

The line display need not be presented in a plane parallel to the film, but could be at an angle thereto with appropriate interceding mirrors and positioning controls therefor.

While the invention has been particularly described and shown relative to the foregoing embodiment, it will be understood by those having normal skill in the art that various other changes and modifications may be made without departing from the spirit of this invention.

What is claimed is:

1. A photocomposer comprising:
means for displaying lines having at least one illuminated portion thereof, said lines being displayed at a relatively fixed location;
means for providing a sequence of said lines to said displaying means for defining the appearance of characters or symbols;
a photosensitive medium;
a reciprocating light coupling means constructed and arranged for exposing said illuminated portion of said lines to said photosensitive medium in accordance with said sequence so as to record said characters or symbols thereon;
said photosensitive medium being a film strip;
said lines are displayed in an orientation parallel to the length of said film strip; and
said displaying means being a cathode ray tube having said lines displayed on the face thereof in substantially the same location.

References Cited

UNITED STATES PATENTS

| | | | |
|---|---|---|---|
| 2,952,796 | 9/1960 | Crews | 315—21 |
| 3,041,947 | 7/1962 | Mulock | 95—4.5 |
| 2,261,538 | 11/1941 | Brand | 95—4.5 |

JOHN M. HORAN, Primary Examiner